US008531142B2

(12) United States Patent
Liu et al.

(10) Patent No.: US 8,531,142 B2
(45) Date of Patent: Sep. 10, 2013

(54) BI-POWER MOTOR CONTROLLING APPARATUS

(75) Inventors: Ming-Lung Liu, Taoyuan Hsien (TW);
Chun-Chia Lu, Taoyuan Hsien (TW);
Chia-Feng Wu, Taoyuan Hsien (TW);
Chun-Lung Chiu, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 324 days.

(21) Appl. No.: 12/772,448

(22) Filed: May 3, 2010

(65) Prior Publication Data

US 2010/0289441 A1    Nov. 18, 2010

(30) Foreign Application Priority Data

May 12, 2009   (TW) ................................ 98208127 U

(51) Int. Cl.
*H02P 6/00*   (2006.01)
(52) U.S. Cl.
USPC ............... 318/400.29; 318/268; 318/400.24; 318/400.26; 318/400.38; 318/400.4; 363/34; 363/45; 363/46; 363/48; 363/76; 363/74; 363/148; 363/149; 323/212; 323/219
(58) Field of Classification Search
USPC ............... 318/400.29, 268, 400.24, 400.26, 318/400.3, 400.38, 400.4; 363/34, 45, 46, 363/48, 76, 74, 148, 149; 323/212, 219
See application file for complete search history.

(56) References Cited

U.S. PATENT DOCUMENTS

| | | | | | |
|---|---|---|---|---|---|
| 4,796,142 | A | * | 1/1989 | Libert | 361/23 |
| 4,833,628 | A | * | 5/1989 | Curran, Jr. | 318/800 |
| 4,876,468 | A | * | 10/1989 | Libert | 327/438 |
| 4,912,390 | A | * | 3/1990 | Curran et al. | 318/812 |
| 5,220,258 | A | * | 6/1993 | Hans et al. | 318/400.2 |
| 5,317,245 | A | * | 5/1994 | Moritz et al. | 318/400.3 |
| 5,463,299 | A | * | 10/1995 | Futami et al. | 318/618 |
| 5,606,232 | A | * | 2/1997 | Harlan et al. | 318/400.3 |
| 5,825,642 | A | * | 10/1998 | Ishii et al. | 363/141 |
| 5,869,946 | A | * | 2/1999 | Carobolante | 318/811 |
| 6,054,823 | A | * | 4/2000 | Collings et al. | 318/400.04 |
| 6,188,187 | B1 | * | 2/2001 | Harlan | 318/400.04 |
| 6,262,412 | B1 | * | 7/2001 | Hirata et al. | 250/214 R |
| 6,285,146 | B1 | * | 9/2001 | Harlan | 318/400.04 |
| 6,650,072 | B2 | * | 11/2003 | Harlan | 318/400.2 |
| 6,664,756 | B2 | * | 12/2003 | Horng et al. | 318/722 |
| 7,038,408 | B2 | * | 5/2006 | Lin et al. | 318/268 |
| 7,139,377 | B2 | * | 11/2006 | Pinault | 379/201.01 |
| 7,233,121 | B2 | * | 6/2007 | Wu et al. | 318/400.17 |
| 7,323,836 | B2 | * | 1/2008 | Lin et al. | 318/268 |

* cited by examiner

Primary Examiner — Rita Leykin
(74) Attorney, Agent, or Firm — Muncy, Geissler, Olds & Lowe, PLLC

(57) ABSTRACT

A bi-power motor controlling apparatus, which is electrically connected with a motor, includes a driver IC having a first pin and a second pin. The first and second pins are used to receive a first power and a second power, respectively, from outside. The second power is supplied to the driver IC, and the first power is supplied to the motor for controlling the rotational speed of the motor.

9 Claims, 4 Drawing Sheets

US 8,531,142 B2

BI-POWER MOTOR CONTROLLING APPARATUS

CROSS REFERENCE TO RELATED APPLICATIONS

This Non-provisional application claims priority under 35 U.S.C. §119(a) on Patent Application No(s). 098208127 filed in Taiwan, Republic of China on May 12, 2009, the entire contents of which are hereby incorporated by reference.

BACKGROUND OF THE INVENTION

1. Field of Invention

The present invention relates to a bi-power motor controlling apparatus that is capable of improving the noise of a motor.

2. Related Art

The conventional motor controlling apparatus mainly includes a driver IC and a Hall element. The driver IC is used to receive a power, which is applied to be the operation voltage of the motor and the driver IC, from outside. Then, the driver IC can output a driving circuit to the coil of the motor according to the received power so as to drive the motor to rotate, so that the rotational speed of the motor can be adjusted according to the voltage value of the power. Based on the above-mentioned motor controlling method by changing the voltage value of the power, the range of the controllable rotational speed is limited due to that the driver IC and the motor use the same power source. In addition, the rotational speed can not be modulated.

SUMMARY OF THE INVENTION

To solve the above-mentioned problem, the present invention is to provide a bi-power motor controlling apparatus, which is electrically connected with a motor and includes a driver IC. The driver IC has a first pin and a second pin for receiving a first power and a second power, respectively, form outside. The second power is supplied to the driver IC, and the first power is supplied to the motor. The rotational speed of the motor is controlled by adjusting the first power. In addition, the first power is decreased at every moment that the phase commutation between the N pole and S pole occurs in the coil of the motor, so that the noise of the motor caused by the pole commutation can be improved.

In addition, the above-mentioned driver IC further includes a third pin, a fourth pin, a fifth pin, a sixth pin and a seventh pin. The third, fourth and fifth pins are electrically connected with a sensor, and the sixth and seventh pins are electrically connected with the coil of the motor.

These and other features, aspects, and advantages of the present invention will become better understood with regard to the following description, appended claims, and accompanying drawings.

DETAILED DESCRIPTION OF THE INVENTION

The present invention will be apparent from the following detailed description, which proceeds with reference to the accompanying drawings, wherein the same references relate to the same elements.

Figure 1:
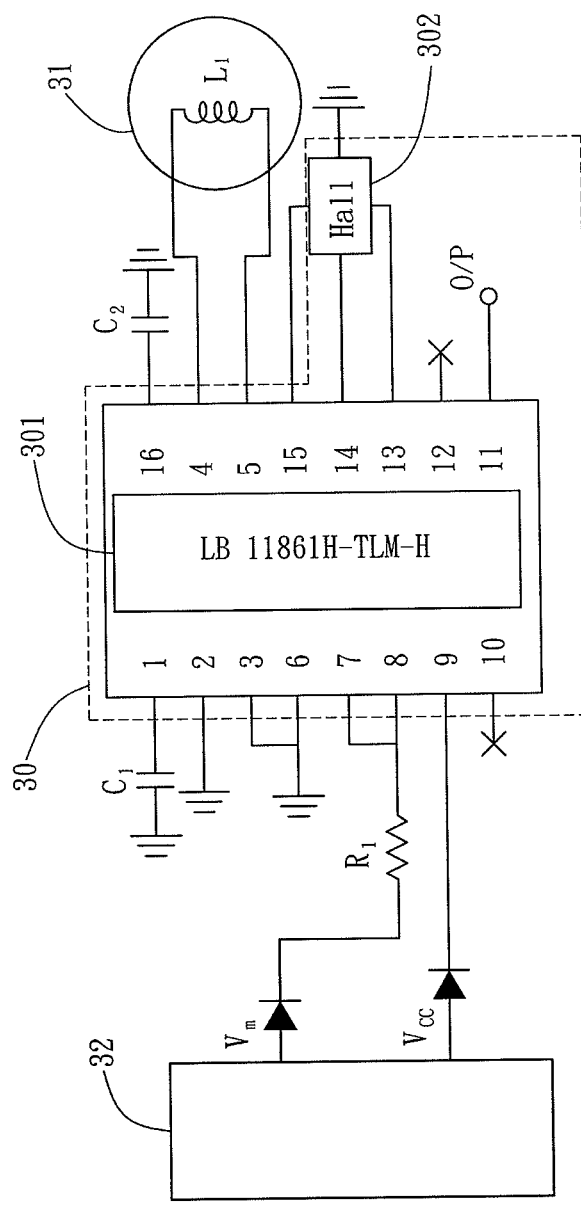
FIG. 1 is a schematic diagram showing a bi-power motor controlling apparatus according to a first embodiment of the present invention.

With reference to FIG. 1, a bi-power motor controlling apparatus 30 of the present invention is electrically connected with a motor 31 and an external system apparatus 32.

The system apparatus 32 can provide a first power $V_m$ and a second power $V_{cc}$. The first power $V_m$ is an adjustable power signal, and it can be a triangle-wave power. The system apparatus 32 provides to the first power $V_m$ to the motor 31 for achieving the purpose of controlling the rotational speed of the motor 31 through the first power $V_m$. The second power $V_{cc}$ is a DC power, which is supplied to the bi-power motor controlling apparatus 30.

Figure 3:
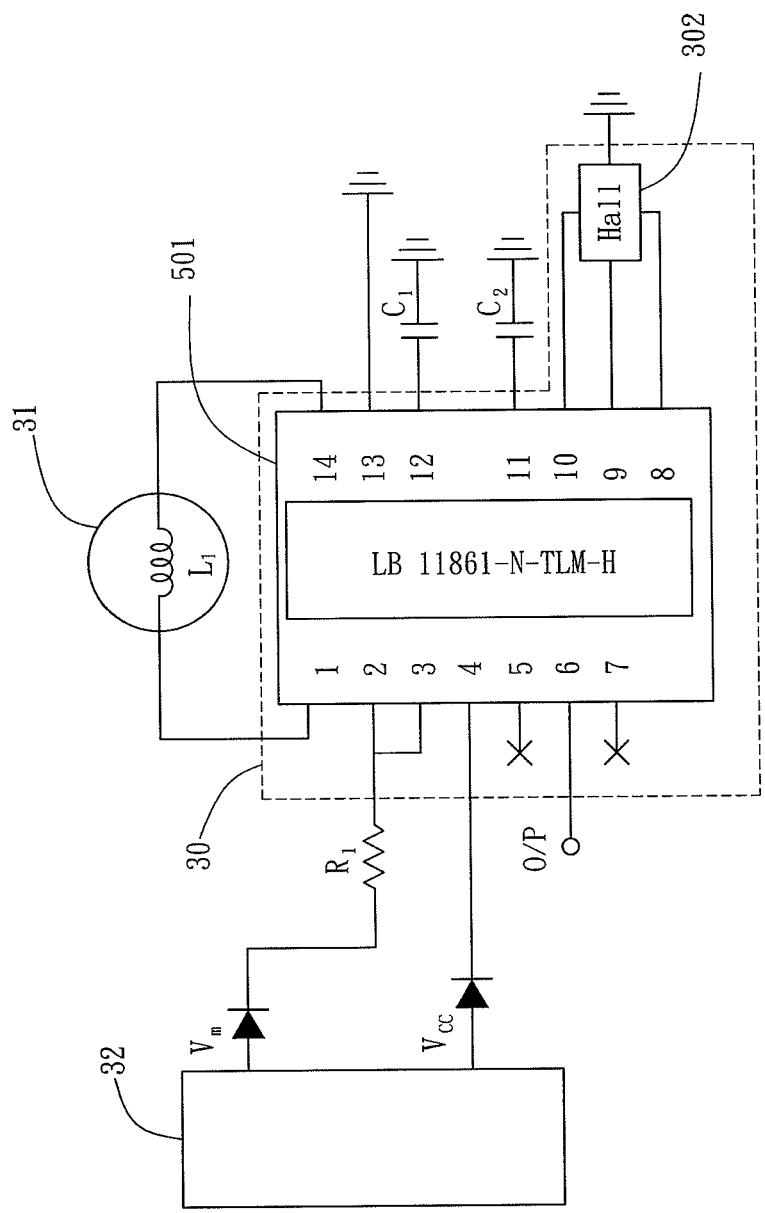
FIG. 3 is a schematic diagram showing a bi-power motor controlling apparatus according to a second embodiment of the present invention.

The bi-power motor controlling apparatus 30 includes a driver IC 301 and a sensor 302. The driver IC 301 can be the driver IC, which is available in the present market, such as the driver IC with a code number of LB 11861H-TLM-H or LB 11861-N-TLM-H. As shown in FIG. 1, the driver IC 301 of a first embodiment, which has the code number of LB 11861H-TLM-H, includes 16 pins; as shown in FIG. 3, the driver IC 301 of a second embodiment, which has the code number of LB 11861-N-TLM-H, includes 14 pins.

FIG. 1 is a schematic diagram showing a bi-power motor controlling apparatus 30 according to the first embodiment of the present invention. In this embodiment, the sensor 302 can be a Hall element for sensing the phase commutation so as to generate a phase-commutation sensing signal, which is then outputted to the driver IC 301. Herein, the phase commutation means the pole commutation between the N pole and S pole in the coil $L_1$ of the motor 31.

In this embodiment, the driver IC 301 with the code number of LB 11861H-TCM-H having 16 pins is used. The connections of the 16 pins will be described hereinbelow with reference to FIG. 1. The pins of No. 1 and No. 16 are electrically connected with the capacitors C1 and C2, respectively, and then grounded. The pin of No. 2 is directly grounded. The pins of No. 3 and No. 6 are electrically connected with each other and then grounded. The pins of No. 4 and No. 5 are electrically connected with two ends of the coil $L_1$ of the motor 31, respectively. The pins of No. 7 and No. 8 are electrically connected with each other and then connected to a resistor R1 and the external system apparatus 32. The pins of No. 9 and No. 11 are electrically connected with the external system apparatus 32. The pins of No. 10 and No. 12 are floating. The pins of No. 13, No. 14 and No. 15 are separately connected to the sensor 302.

The pins of No. 7 and No. 8 can receive a first power $V_m$, which is to be provided to the motor 31, from the system apparatus 32, so that the rotational speed of the motor 31 can be controlled by adjusting the first power $V_m$. The pin of No. 9 can receive a second power $V_{cc}$, which is to be provided to the driver IC 301, from the system apparatus 32. The pin of No. 11 can feed back the rotational speed of the motor 31 by transmitting a rotational-speed feedback signal $S_F$, which is obtained by detecting the motor 31 with the sensor 302, to the system apparatus 32. In the prior art, the pin of No. 10 is used to receive the PWM (Pulse-width modulation) signal for controlling the rotational speed of the motor 31. However, in this embodiment, the rotational speed of the motor 31 is controlled by the first power $V_m$ instead of the original PWM signal, so that the pin of No. 10 is floating and is not connected with any device or apparatus.

Figure 2:
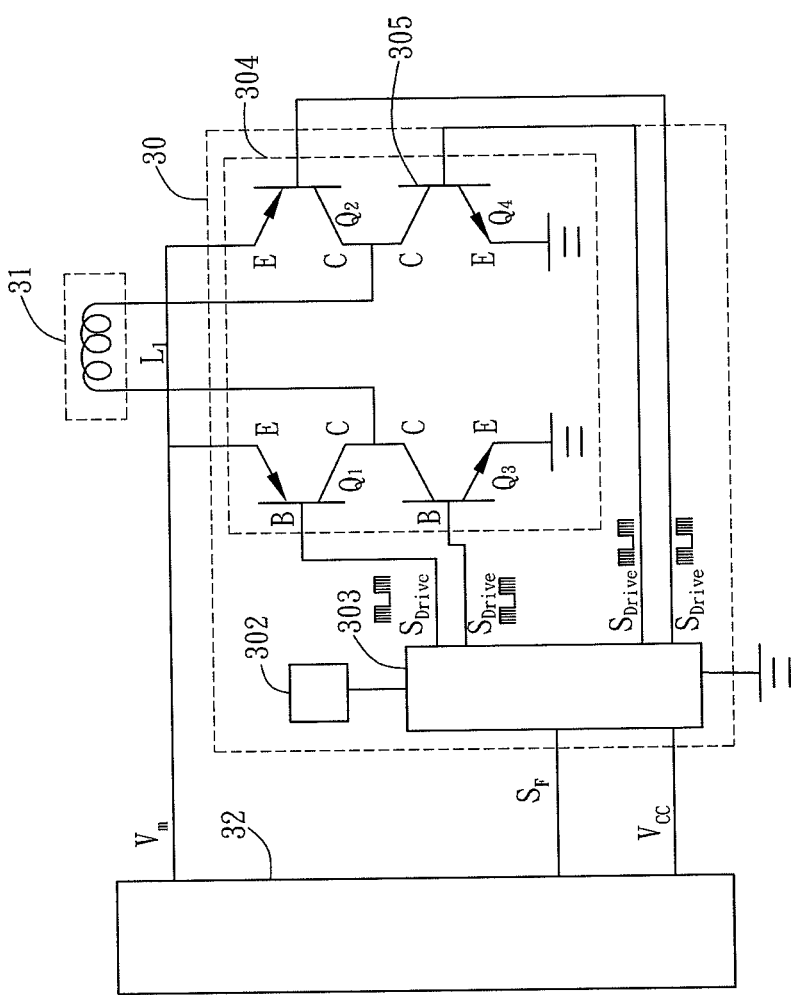
FIG. 2 is a circuit diagram of the bi-power motor controlling apparatus of the present invention.

Referring to FIG. 2, the above-mentioned driver IC 301 mainly includes a control circuit 303 and a driving circuit 304. The control circuit 303 is electrically connected with the external system apparatus 32 and the sensor 302 for receiving the second power $V_{cc}$ and the phase-commutation sensing signal, respectively. Then, the control circuit 303 can generate and output a plurality of driving signal $S_{Drive}$ according to the phase-commutation sensing signal. The driving circuit 304 is electrically connected with the external system apparatus 32 and the control circuit 303 for receiving the first power $V_m$ and the driving signal $S_{Drive}$ and driving the motor 31 to rotate according to the first power $V_m$ and the driving signal $S_{Drive}$. In practice, the driving circuit 304 can be a full-bridge circuit including four switch units 305, which can be transistors and electrically connected with the coil $L_1$ of the motor 31. There are four driving signals $S_{Drive}$ outputted to control the alternate turn-on or turn-off of four switch units 305, so that the direction of the current flowing through the coil $L_1$ of the motor 31 is alternately switched to drive the motor 31 to rotate.

FIG. 3 is a schematic diagram showing a bi-power motor controlling apparatus according to a second embodiment of the present invention. With reference to FIG. 3, the difference between the first and second embodiments is in that the driver IC 501 of the second embodiment is the driver IC with the code number of LB 11861-N-TLM-H. Thus, the definitions of all pins of the driver IC 501 are different from those defined in the first embodiment. Regarding to the other apparatus and elements such as the system apparatus 32 and the sensor 302, they are the same as those disclosed in the first embodiment, so the detailed descriptions thereof will be omitted.

In this embodiment, the driver IC 501 having 14 pins is used. The connections of the 14 pins will be described hereinbelow with reference to FIG. 3. The pins of No. 1 and No. 14 are electrically connected with two ends of the coil $L_1$ of the motor 31, respectively. The pins of No. 2 and No. 3 are electrically connected with each other and then connected to a resistor R1 and the external system apparatus 32. The pins of No. 4 and No. 6 are electrically connected with the external system apparatus 32. The pins of No. 5 and No. 7 are floating. The pins of No. 8, No. 9 and No. 10 are separately connected to the sensor 302. The pins of No. 11 and No. 12 are electrically connected with the capacitors C1 and C2, respectively, and then grounded. The pin of No. 13 is directly grounded. Similarly, the pin of No. 7, which is used to receive the PWM signal in the prior art, is disabled in the second embodiment.

Figure 4:
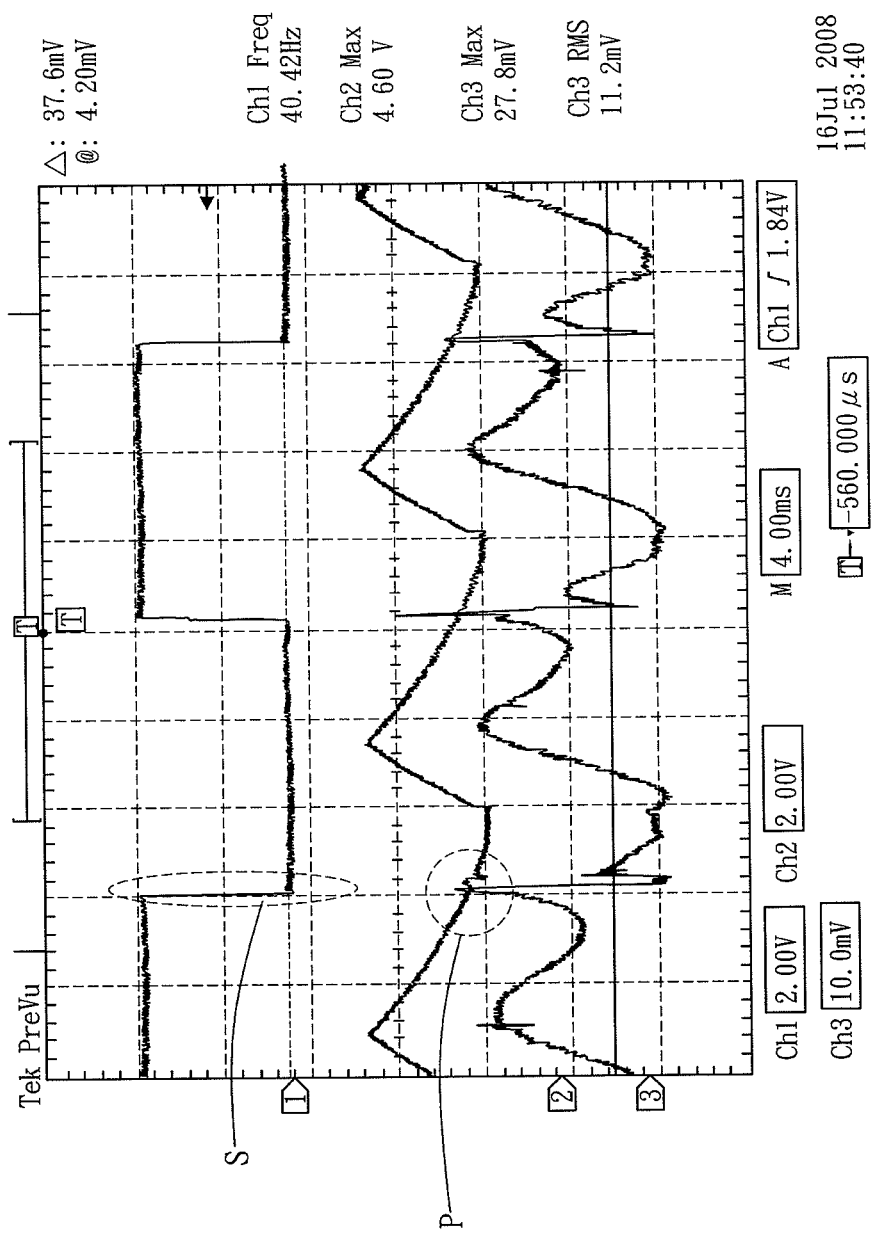
FIG. 4 is a schematic diagram showing the relation between the first power and the phase commutation of the motor.

The first and second embodiments of the present invention use the driver IC 301 or 501 in cooperate with two powers to control the rotational speed of the motor 31 instead of the conventional PWM signal. As mentioned above, the second power $V_{cc}$ is supplied to the driver IC 301 or 501, and the first power $V_m$ is supplied to the motor 31. Then, the rotational speed of the motor 31 can be controlled by adjusting the voltage value of the first power $V_m$. With reference to FIG. 4, since the driver IC 301 or 501 and the motor 31 receive different and independent powers, the driver IC 301 or 501 can not be interfered by the first power $V_m$, which is inputted to the motor 31 and is a triangle-wave power (or other pulse-type power). Moreover, by adjusting the first power $V_m$, the phase commutation S of the coil $L_1$ of the motor 31 can occur right on the point P, which is in the lower power period of the first power $V_m$. Therefore, the noise generated by the motor 31 during the phase commutation can be improved, and the signal and electronic noise generated by the switching of the driver IC 301 or 501 that is occurred in the prior art with using the PWM signal to control the rotational speed of the motor 31 can also be improved.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A bi-power motor controlling apparatus, which is electrically connected with a motor and receives a first power and a second power from outside, the apparatus comprising:
a driver IC having a first pin and a second pin for receiving the first power and the second power, respectively, and the driver IC does not receive the pulse-width modulation signal, wherein the second power is supplied to the driver IC, the first power is supplied to the motor, and a rotational speed of the motor is controlled by adjusting the first power,
wherein the driver IC comprises:
a control circuit electrically connected with a sensor and receiving the second power and a phase-commutation sensing signal generated by the sensor, wherein the control circuit generates a driving signal according to the phase-commutation sensing signal; and
a driving circuit electrically connected with the control circuit, receiving the first power and the driving signal, and driving the motor to rotate according to the first power and the driving signal,
wherein the driving circuit is a full-bridge circuit, the first power is a triangle-wave power, and by adjusting the first power, a phase commutation of a coil of the motor occur on a point, which is in the lower power period of the first power.

2. The apparatus according to claim 1, wherein the sensor electrically connected with the driver IC for sensing the phase commutation of the motor so as to generate the phase-commutation sensing signal and output the phase-commutation sensing signal to the driver IC.

3. The apparatus according to claim 2, wherein the driver IC further has a third pin, a fourth pin, a fifth pin, a sixth pin, and a seventh pin, the third pin, the fourth pin and the fifth pin are electrically connected with the sensor, and the sixth pin and the seventh pin are electrically connected with the coil of the motor.

4. The apparatus according to claim 1, wherein a code number of the driver IC is LB 11861H-TLM-H or LB 11861-N-TLM-H.

5. The apparatus according to claim 4, wherein the driver IC with the code number of LB 11861H-TLM-H has 16 pins, and the driver IC with the code number of LB 11861-N-TLM-H has 14 pins.

6. The apparatus according to claim 1, wherein the driving circuit comprises a plurality of switch units, and the switch units are electrically connected with a coil of the motor.

7. The apparatus according to claim 6, wherein the switch unit is a transistor.

8. The apparatus according to claim 1, wherein the apparatus is electrically connected with a system apparatus, the system apparatus provides the first power and the second power, and the first power is an adjustable power signal.

9. The apparatus according to claim 1, wherein the second power is a DC power.

* * * * *